Figures 1, 2:
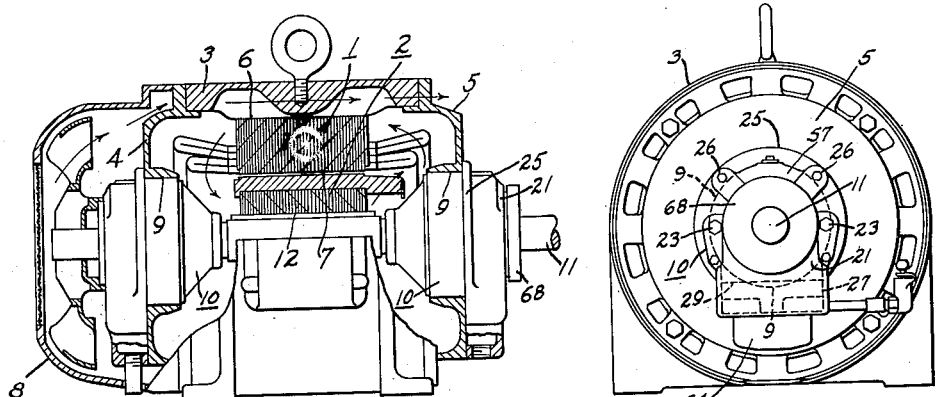

April 22, 1941.  J. L. BROWN  2,239,283

OIL-RING-LUBRICATED ANTIFRICTION BEARING

Filed Nov. 26, 1938

WITNESSES:

INVENTOR
John L. Brown.
BY
ATTORNEY

Patented Apr. 22, 1941

2,239,283

UNITED STATES PATENT OFFICE 2,239,283

OIL-RING-LUBRICATED ANTIFRICTION BEARING

John L. Brown, Verona, Pa., assignor to Westinghouse Electric & Manufacturing Company, East Pittsburgh, Pa., a corporation of Pennsylvania Application November 26, 1938, Serial No. 242,530

5 Claims. (Cl. 308—187)

My invention relates to a novel design and oil-ring-lubricating means for ball or roller bearings, commonly known as antifriction bearings, such as are designed for use on horizontal-shaft electric motors.

My invention has more particular relation to ball bearings of the so-called cartridge type, by which it is meant that the ball-bearing housing is in the form of a so-called cartridge which is seated and removably secured within a bore in the end-bracket of the motor, said bore being necessarily somewhat smaller than the main bore of the stator member at the air-gap portion of the motor, and particularly, somewhat smaller than the main bore of the smallest stator member which is utilized in that particular motor-frame, referring to the usual practice of utilizing the same motor-frame for a plurality of sizes and ratings of motors, for economy in production.

Such cartridge-type antifriction bearings are sometimes required to be oil-lubricated, rather than grease-lubricated, and when oil-lubrication has been utilized, there have arisen a number of problems particularly relating to the provision of an adequate storage-space for the oil, the maintenance of a sufficiently-constant oil-level, and provision for satisfactory operation with a reasonable amount of tilting of the shaft.

An object of the present invention is to provide a novel oil-reservoir portion or attachment, for such cartridge-type antifriction bearings, in which an adequate oil-storing space is provided, with the necessary large oil-surface area for maintaining a fairly constant level of oil, and with an oil ring for raising oil from the oil-reservoir to the shaft.

A further object of my invention is to provide a construction of oil-ring-lubricated, cartridge-type, antifriction bearing which is particularly adapted for utilization on explosion-proof, dual-ventilated motors, which are totally enclosed motors having an internal ventilating fan and also having an externally mounted ventilating fan for blowing air over the main frame-portion of the motor, a shroud being usually provided for properly guiding the external ventilating-air over the motor-frame.

More generally stated, my invention relates to the provision of a bearing-construction having generously proportioned air-passages for equalizing the air-pressures at both ends of the bearing-construction, and for providing communication with the outside atmosphere, so as to adapt the bearing for use in a machine which is subject to different air-pressure conditions at different external points around the outside of the bearing-assembly.

With the foregoing and other objects in view, my invention consists in the structures, combinations, methods and parts hereinafter described and claimed, and illustrated in the accompanying drawing, wherein—

Figure 3:
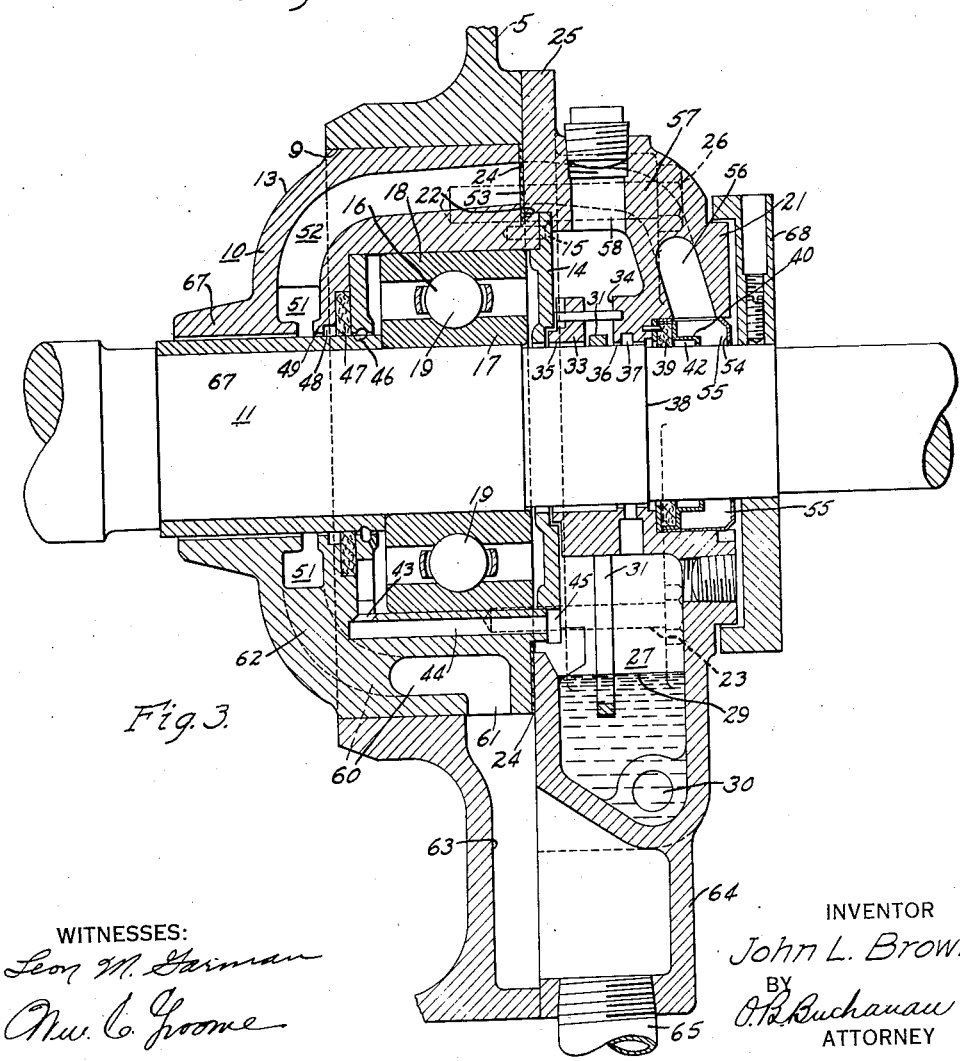

Figure 1 is a small-scale longitudinal sectional view illustrative of a dual-ventilated, explosion-proof motor of a type for which one form of my invention is particularly adapted, Fig. 2 is an end view thereof, and Fig. 3 is a detail sectional view illustrative of my novel bearing-assembly.

The motor which is illustrated in Fig. 1 comprises a stator member 1 and a rotor member 2. The stator member 1 comprises a stator frame proper 3, two end-brackets 4 and 5, and a stator-core 6 having a central bore 7 constituting one terminal of the air gap of the machine. The stator frame 3 is also partially surrounded by a shroud 8 for the external ventilating air. Each of the end-brackets 4 and 5 is provided with a bearing-centering bore 9 for receiving the bearing-assembly 10. As previously explained, the bearing-centering bore 9 must necessarily be somewhat smaller than the main air-gap bore 7, for facility in the assembling and dismantling of the motor. The rotor member 2 comprises a shaft 11 which is rotatably carried by the two bearing-assemblies 10, said shaft carrying a rotor-core 12 in operative relation to the stator-core 6.

The detailed construction of my bearing-assembly 10 is shown more clearly in Fig. 3. This assembly includes a cartridge-type bearing-housing which is built in two parts. The main portion of the bearing-housing, or the bearing-housing proper 13, is removably seated within the bearing-centering bore 9 of the bracket 4 or 5, the bracket 5 being illustrated in Fig. 3. The bearing-housing or cartridge is completed by a cartridge-cap 14, which is a ring-shaped member secured to the bearing-housing 13 by bolts 15. It will be noted that the bearing-housing or cartridge 13 is capable of complete removal from the machine. In other words, the stator member of the machine may be completely slid off from the rotor member without disturbing the bearing cartridge 13, provided that the shaft 11 is first suitably supported independently of the stator member, thus materially facilitating the making of repairs and alterations on the motor. Secured within the bearing housing 13 is a ball bearing or other so-called antifriction bearing 16 which may consist of an inner race 17 which is pressed on the shaft 11, an outer race 18 which is pressed within the cartridge 13, and a plurality of balls or other rolling antifriction members 19.

In accordance with my invention, I provide a large outer bearing-cap 21 which is centered on the bearing-housing 13 by means of a rabbet fit 22, and which is removably secured to the bearing-housing 13 by means of bolts 23. The joint between the bearing-housing 13 and the outer bearing-cap 21 is preferably made substantially oil-tight by means of a gasket 24. The outer bearing cap is larger than the bearing-centering bore 9 of the bracket 5, thus providing flanges 25 which are bolted to the bracket 5, as indicated at 26, so as to removably attach the outer bearing-cap 21 to the bracket 5, thus also, through the bolts 23, holding the bearing cartridge 13 in place within the bearing-centering bore 9 of the bracket 5.

In accordance with my invention, the outer bearing-cap 21 is provided, in its bottom portion, with an oil-reservoir 27 for holding a quantity of oil, as indicated by the oil-level 29. The bottom of the oil-reservoir 27 is provided with an opening for an overflow plug 30. From Fig. 3 it will be noted that the oil-reservoir 27 provides an adequate oil-storage space at some distance below the shaft 11, and also considerably lower than the bottom edge of the bearing-housing or cartridge 13 which fits within the bearing-centering bore 9 of the bracket 5. From Fig. 2, it will be noted that the portion of the oil-reservoir 27 corresponding to the oil-level 29 is enlarged laterally with respect to the bottom portion of the bearing-housing or cartridge 13 which fits within the bearing-centering bore 9 of the bracket 5. The result of this construction is a wide oil-level portion 29, wider than the bottom portion of the bearing-centering bore 9, and disposed at a considerable distance below the shaft 11, thus avoiding difficulties in regard to oil-leakage along the shaft in the event of a tilting of the nominally horizontal shaft 11. The wide oil-surface 29 assures a fairly constant oil-level, because a relatively large loss or depletion of the oil will not greatly lower the oil-level 29, because of the wide area thereof.

As further shown in Fig. 3, my bearing-assembly also includes an oil ring 31 which is carried by the shaft 11 within the outer bearing-cap 21. This oil ring is of a sufficient size to extend down below the oil-level 29, and preferably to extend down at least as far as a point close to the bottom of the bearing-centering bore 9 in the bracket 5, or even below the bottom of said bearing-centering bore 9. This provision of a large-diameter oil-ring, coupled with the low oil-level 29 over an extended area, results in the maintenance of an adequate oil-supply, delivered to the shaft 11 by the ring 31 over a long period of time, without requiring frequent additions of small amounts of replacement-oil, as in previous designs which did not utilize a large external bearing-cap 21 which is separate from, and independent of, the inner cartridge-cap 14, and which is detachable from the cartridge housing 13 and is larger than the bearing-centering bore 9 which receives the cartridge.

The oil ring 31 is preferably held in position, within the outer bearing-cap 21, by means of a central sleeve-portion 33 which may be cast integral with the outer bearing-cap 21, the top of said central sleeve-portion 33 being slotted to receive and guide the oil ring 31, as indicated at 34. This central sleeve-portion 33 is somewhat larger than the shaft 11, so as to provide a clearance-space 35 between itself and the shaft, so that the oil which is delivered to the shaft by the oil ring 31 can flow along the clearance-space 35 until it reaches the ball bearing 16.

At a point to the outside of the oil ring 31, the central sleeve-portion 33 has a reduced clearance-space 36 between the sleeve and the shaft, and this reduced clearance-space 36 is provided with a pressure-relief groove 37, beyond which, still further out on the shaft, the shaft is provided with an oil-throwing shoulder 38, and beyond that, the outer bearing-cap 21 is provided with felt washers 39, wiping on the shaft, and beyond the felt washers an offset, projecting annular flange 40, providing a dead-air space 42. The object of the elements 36 to 40 is to prevent oil-leakage along the shaft at the outer end of the bearing.

From the inner end of the bearing 16, the superfluous oil may return to the oil-reservoir 27 in the outer bearing-cap 21 through drainage-holes 43 and 44, which discharge through a notch 45 cut in the bottom of the cartridge-cap 14. An inner oil-leakage protective means is provided, beyond the inner end of the bearing 16, for preventing leakage along the shaft, as illustrated in the form of an oil-thrower 46, felt washer 47, and a dead-air space 48 provided by a flange 49. Thus I prevent oil-leakage into the motor.

The complete bearing-assembly has built into it a series of air-passages of adequate size for preventing oil-leakage, either in liquid form as driven out by unbalanced air-pressures, or in the form of oil-vapors carried out of the housing by air-currents. These air-passages include depressions cast in the bearing-housing 13 for providing an inner air-pressure-equalizing chamber 51 substantially surrounding the shaft 11 at a point inside of the flange 49. I also provide an air-bypass passage 52 in the upper portion of the bearing-housing 13, for providing air-communication from the inner air-pressure equalizing chamber 51 to the outside end of the bearing housing 13, where said housing abuts against the outer bearing-cap 21, as indicated by the numeral 53.

At a point to the outside of the projecting annular flange 40, the outer bearing-cap 21 is provided with a cap-member 54 for providing an outer air-pressure-equalizing chamber 55 substantially surrounding the shaft, said chamber being in communication with an air-bypass passage 56 in the upper portion of the outer bearing-cap 21, said bypass passage terminating at the inside end of the outer bearing-cap in communication with the other air-bypass passage 52 at the point 53. In Fig. 3, the particular section therein illustrated happens to pass through a boss 57 which extends through the air-bypass passage 56, but the air-communication is completed on either side of the boss, as indicated by the dotted lines. The boss 57 is provided for the purpose of affording means for providing an oil-filling opening 58 which also serves to provide access to the space above the oil ring 31.

The air-pressure-equalizing means is completed by an additional air-communication passage 60 which is cast into the bottom portion of the bearing-housing 13 to connect the inner air-pressure-equalizing chamber 51 with a point 61 in the bottom of the bearing-housing 13 near the outer end thereof. The particular section illustrated in Fig. 3 happens to pass through a boss 62 which is provided for the purpose of accommodating the previously mentioned oil-drainage passages 43 and 44, but the air-communication passage 60 passes on either side of the boss 62, as indicated by the dotted lines. The air-communicating point 61 in the bottom of the bearing-housing 13 is preferably in communication with the top end of a grooved depression-forming portion 63 of the bracket 5, and this grooved depression-forming portion is preferably covered by a depending shield 64 which is provided at the bottom portion of the outer-bearing-cap 21, the shield 64 being in communication with the atmosphere outside of the motor, as by means of a pipe 65, Fig. 3.

At the inner end of the bearing-housing or cartridge 13, I have shown a common type of long-surface explosion-resisting seal 67, and at the outer end of the entire assembly, the rotor-shaft 11 is provided with an external rotating labyrinth-seal flange 68 which cooperates with the outer end of the outer bearing-cap 21 to assist in excluding dirt from the assembly.

The result of my novel construction, as hereinabove described and illustrated, is a combination of features which has proved to be very successful in practice, and while I have illustrated the invention in a preferred form of embodiment, and particularly one which is applicable to fan-cooled explosion-resisting motors, it is obvious that the invention is applicable to other types of machines and that various substitutions, additions and omissions of parts may be resorted to by those skilled in the art without departing from all of the essential features of my invention. I desire, therefore, that the appended claims shall be accorded the broadest construction consistent with their language and the prior art.

I claim as my invention:

1. A bearing-assembly comprising a stationary bracket having a bearing-centering hole therein, a cartridge-type bearing-housing seated and removably secured within said hole in the bracket, an antifriction bearing within said bearing-housing, a substantially horizontal shaft rotatably supported within said antifriction bearing, an outer bearing-cap removably secured on the outside of said bracket and in substantially oil-tight relation to the outside end of said bearing-housing, said outer bearing-cap including, in its bottom portion, an oil-reservoir extending beyond the confines of the bearing-centering hole in the bracket for providing an oil-storage space having a wide oil-level portion wider than the bottom portion of said bearing-centering hole, said oil-reservoir remaining intact when the outer bearing-cap is removed, and an oil ring carried by the shaft within said outer bearing-cap for raising oil from the oil-reservoir to the shaft.

2. A bearing-assembly comprising a stationary bracket having a bearing-centering hole therein, a cartridge-type bearing-housing seated and removably secured within said hole in the bracket, an antifriction bearing within said bearing-housing, a substantially horizontal shaft rotatably supported within said antifriction bearing, and an outer bearing-cap removably secured on the outside of said bracket and in substantially oil-tight relation to the outside end of said bearing-housing, said outer bearing-cap including, in its bottom portion, an oil-reservoir extending downwardly and laterally beyond the confines of the bearing-centering hole in the bracket for providing an oil-storage space having a wide oil-level portion wider than the bottom portion of said bearing-centering hole, said oil-reservoir remaining intact when the outer bearing-cap is removed, and an oil ring carried by the shaft within said outer bearing-cap for raising oil from the oil-reservoir to the shaft, said oil ring having a sufficient size to extend down at least as far as a point close to the bottom of said bearing-centering hole in the bracket.

3. A bearing-assembly comprising a stationary bracket having a bearing-centering hole therein, a cartridge-type bearing-housing seated and removably secured within said hole in the bracket, an antifriction bearing within said bearing-housing, a substantially horizontal shaft rotatably supported within said antifriction bearing, an outer bearing-cap which is removably secured in place relatively to said bracket and said bearing-housing, said bearing-cap having a flange which is disposed in overlapping relation to the outside of said bracket and having a portion which is centered and removably secured in substantially oil-tight relation to the outside end of said bearing-housing, said outer bearing-cap including an oil-reservoir, said oil-reservoir remaining intact when the outer bearing-cap is removed, and an oil ring carried by the shaft within said outer bearing-cap for raising oil from the oil-reservoir to the shaft, said cartridge-type bearing-housing having a separately secured cartridge-cap which covers the outer end of the antifriction bearing and which remains in place when the outer bearing-cap is removed.

4. The invention as defined in claim 1, characterized by said cartridge-type bearing-housing having a separately secured cartridge-cap which covers the outer end of the antifriction bearing and which remains in place when the outer bearing-cap is removed.

5. The invention as defined in claim 2, characterized by said cartridge-type bearing-housing having a separately secured cartridge-cap which covers the outer end of the antifriction bearing and which remains in place when the outer bearing-cap is removed.

JOHN L. BROWN.